United States Patent Office 3,128,298
Patented Apr. 7, 1964

3,128,298
SURFACTIVE LOW POLYMERS
Norman A. Lefevre, Bay City, and Harold G. Hahn, Midland, Mich., assignors to The Dow Chemical Company, Midland, Mich., a corporation of Delaware
No Drawing. Filed Feb. 4, 1960, Ser. No. 6,588
4 Claims. (Cl. 260—458)

The present invention relates to olefin-derived low polymer sulfates and/or sulfonates, and, more particularly, it concerns methods of producing and using such low polymers which have surface active properties.

It is believed that the successful operation of sulfur oxide-free radical catalyzed, emulsifier-free polymerization systems for olefinic-type monomers depends, at least in part, upon the formation during an early stage in the polymerization reaction of a surface active low polymer of the particular olefin monomer being polymerized. High polymer latexes produced in such emulsifier-free systems are of considerable interest since they have low foaming tendencies and provide plastic films having a low order of water sensitivity. Emulsifier-free polymerization systems also provide a homogeneous latex product free of undesirable residual surfactants normally employed in emulsion polymerization systems.

Due to their critical role in an early stage of an emulsifier-free polymerization system, the surface active low polymers are of interest as separate products to be used in controlling polymer latex characteristics. It is believed that previous production of such materials has been limited to the trace amounts obtained in situ within high polymer latexes produced in sulfur oxide-free radical catalyzed, emulsifier-free, polymerization systems.

An object of the present invention is to provide a continuous method whereby olefin derived surface active low polymers can be produced exclusive of the formation of a high polymer latex. It is a further object of the present invention to provide sulfated and/or sulfonated surface active low polymers useful as additives to polymerization systems. It is still a further object of the present invention to provide a polymerization technique for olefinic monomers employing a surface active low polymer derived from the monomer to be polymerized. Further objects will become apparent hereinafter as the invention is more fully described.

In accordance with the present invention, a method is provided which involves introducing an olefinic monomer or mixture thereof as a vapor into a catalyst solution containing a suitable quantity of $SO_3$ and/or $OSO_3$ free radicals and continuously removing the foam subsequently formed on the surface of the catalyst solution before the formation of a high polymer latex. The desired surface active low polymer is then separated from the foam concentrate as by evaporation or extraction with a suitable solvent.

Surface active low polymer sulfonates and/or sulfates produced in accordance with the present invention can be represented by the generic formula $$R[X]_n$$

wherein $n$ is an integer from 1 to 2 and each X is independently selected from the group consisting of —$SO_3H$, —$OSO_3H$ and alkali metal and ammonium salts thereof, and R is selected from the group consisting of mono- and di-valent organic radicals consisting of low polymers having in combined form from 2 to 10 olefinic monomers capable of sulfur oxide-free radical induced polymerization.

Typical olefinic monomers employed in the present invention have the generic formula

wherein X is selected from the group consisting of hydrogen and fluorine, Y is selected from the group consisting of hydrogen, nitrile, fluorine, chlorine, lower alkyls containing from 1 to 5 carbon atoms, Z is selected from the group consisting of hydrogen, fluorine, chlorine, lower alkyl groups saturated and unsaturated containing from 1 to 5 carbon atoms, phenyl and substituted derivatives thereof, carboxylic acid radicals, and esterified carboxylic acid groups wherein the esterifying groups contain up to 10 carbon atoms. Included within the class of olefinic monomers operable in the present invention are ethylene, propylene, butylene, vinyl chloride, vinylidene chloride, vinyl fluoride, vinylidene fluoride, chlorotrifluoroethylene, perfluoroethylene, acrylic acid, methacrylic acid, alkyl acrylates, alkyl methacrylates, acrylonitrile, methacrylonitrile, vinyl acetate, vinyl propionate, vinyl butyrate, styrene, α-methyl styrene, tertiary-butyl styrene, alkyl styrenes, halostyrenes, butadiene, chloroprene and the like free radical activated monomers.

The olefinic monomer or mixture thereof employed is bubbled into the catalyst solution as a vapor and it is desirable that temperature and pressure conditions be maintained at levels which do not cause condensation of the monomer vapor as it is introduced into the catalyst solution. In instances where the monomer employed is liquid at the reaction temperature, sufficient amounts of the monomer vapor for carrying out the reaction can be obtained by first bubbling a stream of an inert gas such as nitrogen into the liquid monomer and then employing the resulting nitrogen-monomer gaseous mixture in the same manner as pure monomer vapor.

Two considerations are of importance in selecting a reaction temperature. The first is that the temperature must be sufficient for generating a suitable number of free radicals in the catalyst solution employed. The second is that a temperature must be selected at which the monomer being reacted is a vapor or has a substantial vapor pressure at normal operating pressures. Generally, the reaction can be carried out at temperatures ranging from about 10° to 95° C. with temperatures in the range from about 20° to 50° C. being preferred for most catalyst systems except those which employ a persulfate alone in which instance somewhat higher temperatures in the range from about 60° to 85° C. are preferable.

Catalyst solutions employed in the present invention contain as solutes ionizable materials capable of providing the desired free radicals of $SO_3$ and/or $OSO_3$ in an aqueous medium. Exemplary of such catalyst systems are those employing persulfates, persulfate-bisulfite mixtures and bisulfite-peroxide mixtures. Persulfates employed alone provide sulfated low polymers while the bisulfite-containing systems provide sulfonated low polymers. The sulfur oxide anions are usually provided as the alkali metal salts of the respective acids. A sufficient amount of the catalyst material is employed to provide a solution containing from about 0.005 to about 5.0 weight percent of the free radical producing solute. The free radical producing solute is defined as that solute which is convertible to either $SO_3$ or $OSO_3$ free radicals. Any additional materials required for the catalyst system, such as the peroxides employed with the bisulfite-peroxide system, are employed in an amount sufficient to provide complete conversion of the sulfur oxide containing solute to free radicals.

Frequently it is desirable to use a free radical accelerator as in the instance of the persulfate-bisulfite catalyst system. Effective for this purpose are metallic ions capable of existing in two valence states, such as iron and copper, in concentrations from about .05 to about 500 parts per million. The pH of the catalyst solution can range from about 1.5 to about 4.5.

Monomer solubility in the aqueous catalyst solution is an important factor affecting the amount of product produced. Generally, in the operation of the present invention, monomer solubility in the aqueous phase from about 0.05 to about 5.0 weight percent is desirable. A lower solubility tends to reduce the rate of reaction and thus a point is reacsed at which so little of the desired low polymer is produced that the method is not practical. On the other hand a high monomer solubility in the aqueous phase increases the tendency of the reaction to proceed toward the formation of a high polymer latex at which point production of the low polymer containing foam product ceases.

When the monomer employed is excessively soluble in the aqueous catalyst solution an inert solubility decreasing agent is added to the solution. A water soluble alkali metal salt of a mineral acid such as hydrochloric acid can be used effectively for this purpose. A sufficient amount is used to decrease monomer solubility to within the desired solubility range.

In instances when the monomer being employed to produce the surface active low polymer is relatively insoluble in the aqueous phase, the addition of an inert solubilizing agent to the catalyst solution is desirable. Generally, any water-soluble organic additive which is a solvent for the monomer being employed can be used to increase monomer solubility in the aqueous catalyst solution. Exemplary of these agents are methanol, ethanol, butanol, acetone, tetrahydrofurane and the like. The amount employed varies generally with the particular additive employed but usually amounts up to about 25 percent by weight of the solution or the amount at which the inorganic salts begin to precipitate out of the aqueous phase are operable.

In one mode of carrying out the present invention, the catalyst solution is prepared in a suitable reaction vessel having a depth sufficient to provide a desired contact time for carrying out the reaction at the monomer vapor-liquid interface as the monomer vapor bubble rises to the surface of the catalyst solution. A desirable contact time is that which permits conversion of a practical amount of the monomer vapor to the desired low polymer. A gas sparger is employed near the bottom of the reaction vessel to accomplish introduction of the monomer vapor into the catalyst solution.

A preferred catalyst solution contains a combination of $SO_3$ and $OSO_3$ free radicals as provided in an aqueous solution containing about 0.5 weight percent of potassium persulfate and about 1.0 weight percent sodium bisulfite in the presence of about 0.7 part per million of accelerating iron ions. The catalyst solution is maintained at a temperature of about 25° C.

An olefinic monomer vapor is bubbled into the above catalyst solution at a rate sufficient to provide a practical amount of foam product without increasing the vapor phase within the reaction zone so as to prevent efficient contacting of the vapor and liquid phases. A foam product is obtained at the surface of the catalyst solution a short time after the beginning of the introduction of the monomer vapor. This foam is removed from the surface of the catalyst solution by means of a vacuum system such as an aspirating system in which there is a product collection trap vessel. The desired low polymer sulfonate is then separated from the foamed product by either evaporating the excess water or extracting the foam directly with a lower alkyl ether. Frequently, it is necessary before extracting the foamed product to acidify the latter with a mineral acid such as sulfuric or hydrochloric acid in order to convert the alkali metal sulfonates to the corresponding ether-soluble acids.

The above-described process may be carried out by either batchwise or continuous process techniques. In the former instance, the desired surface active low polymer forms on the surface of the catalyst solution until the free radical-producing materials are used up or until a sufficient amount of the surface active low polymer has accumulated in the liquid phase to cause the formation of high polymer forming micelles. When continuous process techniques are employed, it is possible to continuously recharge the catalyst solution thereby permitting continuous production of the low polymer-containing foam product for an indefinite period.

In either of the aforementioned continuous or batchwise processes, it is desirable to recover unreacted monomer vapor and any inert gas if such is employed as a monomer carrier. Such gases may be conveniently recycled to the reaction vessel along with fresh monomer vapor.

Surface active low polymers obtained in accordance with the foregoing method are useful in the emulsion type polymerization reactions for olefinic monomers and may be employed in varying amounts from .05 to 5 percent by weight of the polymerization solution to control latex particle size and button size. Generally, the inclusion of these surface active low polymers, which can be, if desired, prepared from the same monomer as is to be polymerized, within a typical emulsion polymerization recipe of olefin-type monomers provides a high polymer latex product having less button coagulation and a lower particle size. Also, the latex product thus prepared is a relatively homogeneous latex which, due to its low foaming tendencies, is particularly useful in film-forming applications.

The following examples are representative of the present invention but should not be construed as limiting.

EXAMPLE 1

A reaction vessel consisting of a 9 inch vertical cylindrical tube-equipped at its lower end with a gas sparger was charged with 875 milliliters of a 1 percent potassium persulfate solution and 875 milliliters of a 2 percent sodium bisulfite solution. The pH of the solution was adjusted to 2.5 by the addition of hydrochloric acid and about 0.0012 gram of ferric ions were added as an accelerator.

A funnel of a diameter slightly less than the inner diameter of the cylindrical reaction tube was placed in an inverted position within the tube so that the funnel rim could be maintained at about 1 inch above the liquid level. The stem of the funnel was connected to an aspirating system in series with a product trap flask.

Gaseous vinyl chloride was bubbled into the above catalyst solution which was maintained at about 22° C. After a short interval of time, a foam product formed at the surface of the catalyst solution. The foam was continuously removed from the surface of the catalyst solution and collected in the trap flask. The vinyl chloride vapor was bubbled into the catalyst solution until about 1250 milliliters of the foam had been collected. The foam mixture thus separated was evaporated to dryness to obtain about 21 grams of a waxy solid product as a residue. This product was chemically analyzed and found to contain on a weight basis 8.4 percent carbon, 2.2 percent hydrogen, 17.4 percent sulfur and 14.4 percent chlorine, the sulfur being present in the form of sulfonate radicals. The low polymer product is water soluble and reduces the surface tension of water. At 20° C. an aqueous 0.1 percent by weight solution of said product has a surface tension of about 54 dynes per centimeter.

EXAMPLE 2

A reaction vessel similar to that described in the foregoing example was charged with 2000 grams of water, 10 grams of potassium persulfate, 20 grams of sodium bisulfite and 0.00125 gram of ferric ions, and sufficient hydrochloric acid to provide a pH of 2.5. A gaseous mixture of vinylidene chloride and nitrogen, prepared by bubbling nitrogen through the liquid vinylidene chloride at about 25° C., was sparged into the catalyst solution at the bottom of the reaction vessel.

After a short period of time, foam began to form on the surface of the catalyst solution. The aspirating system was turned on and the process continued until 1600 grams of the foamed product had been collected. The foamed product thus obtained was evaporated to dryness to obtain a waxy appearing solid residue. This residual product was analyzed by means similar to that employed in the foregoing example and the analysis indicated the presence on a weight basis of 0.7 percent hydrogen, 5.0 percent carbon, 19.7 percent chlorine and 17.4 percent sulfur, the latter component being present substantially in the form of sulfonic acid groups. The low polymer product is water soluble and an aqueous 0.1 percent by weight solution thereof has a surface tension of about 52 dynes per centimeter. An alternative separatory procedure involves extracting the crude low polymer containing foam product, which has been acidified to convert the low polymer acid salts to the corresponding acids, with diethyl ether to obtain an inorganic salt-free low polymer extract. This extract is then evaporated to dryness to obtain a relatively pure residue of the surface active low polymers.

EXAMPLES 3–6

In a manner similar to that of the foregoing examples, the following olefinic monomers were bubbled into similarly prepared catalyst solutions. The foam product obtained from the surface of the catalyst solution was evaporated to dryness to separate a waxy appearing water-soluble product as a residue. The analysis of the products thus obtained and their effect in reducing the surface tension of water at the concentration of 0.1 weight percent are tabulated below in Table I.

Table I

| Monomer Reacted | Percent C | Percent H | Percent S | Percent N | Surface Tension, 0.1 Percent Water Solution, Dynes/Centimeter |
|---|---|---|---|---|---|
| Vinyl acetate | 17.4 | 4.0 | 17.4 | | 45.5 |
| Ethyl acrylate | 9.5 | 1.9 | 20.0 | | 64.7 |
| Styrene | 2.2 | 0.4 | 21.0 | | 62.7 |
| Acrylonitrile | 11.5 | 1.5 | 19.2 | 2.9 | 60.2 |

Vinyl chloride and vinylidine chloride were copolymerized according to a recipe requiring 150 milliliters of water, 100 grams of monomer of which 29 grams was vinyl chloride and 71 grams vinylidene chloride, 0.7 gram of potassium persulfate and 1.0 gram of sodium bisulfite. This mixture was allowed to react for 16 hours at 35° C. Two additional runs were prepared which were identical to the foregoing formulation except that one gram of the vinyl chloride low polymer product of Example 1 was added to the reaction mixture of one run and one gram of the vinylidene low polymer product of Example 2 was added to the other run. The effects of these materials in the polymerization product are shown in comparison to the control run in Table II.

Table II

| Additive | Latex Particle Size (Angstroms) | Button Size (Grams) |
|---|---|---|
| None | 2,370 | 2.5 |
| One gram vinyl chloride low polymer | 1,900 | 0.5 |
| One gram vinylidene low polymer | 1,280 | 1.0 |

In a manner similar to that of the foregoing examples, other olefinic monomers selected from the group consisting of ethylene, propylene, butylene, vinyl fluoride, vinylidene fluoride, chlorotrifluoroethylene, perfluoroethylene, acrylic acid, alkyl acrylates, methacrylic acid, alkyl methacrylates, acrylonitrile, methacrylonitrile, vinyl propionate, vinl butyrate, butadiene, chloroprene, α-methyl styrene, tertiary-butyl styrene, alkyl styrenes, halo-styrenes and the like free radical activated monomers can be substituted for the monomer employed therein achieving thereby comparable results with the formation of a low molecular weight water-soluble, surface active polymer having from 1 to 2 sulfoxy groups which contain from 3 to 4 oxygen atoms.

Similarly, other catalyst systems selected from the group consisting of persulfates and bisulfites, the latter being used with a peroxide, can be employed in the preparation of the surface active low polymers of the present invention.

Various modifications can be made in the present invention without departing from the spirit and scope thereof and it should be understood that the invention is limited only as defined in the claims as read in light of the specification.

We claim:
1. A process for the production of surface active low polymers having the formula

$$r[X]_n$$

wherein $n$ is an integer from 1 to 2 and each X is independently selected from the group consisting of —$SO_3H$, —$OSO_3H$ and alkali metal and ammonium salts thereof, and R is selected from the group consisting of mono- and divalent organic radicals consisting of low polymers of olefinic monomers, which process comprises the steps of introducing an olefinic monomer as a vapor, into an aqueous solution having sulfur oxide free radicals dissolved therein, whereby an aqueous foam product forms on the surface of the aqueous solution, and continuously separating the foam from the solution whereby the desired surface active low polymer is obtained, said olefinic monomer being selected from the group consisting of ethylene, propylene, butylene, vinyl chloride, vinylidene chloride, vinyl fluoride, vinylidene fluoride, chlorotrifluoroethylene, perfluoroethylene, acrylic acid, methacrylic acid, alkyl acrylates, alkyl methacrylates, acrylonitrile, methacrylonitrile, vinyl acetate, vinyl propionate, vinyl butyrate, styrene, α-methyl styrene, alkyl styrenes, halostyrenes, butadiene and chloroprene; and said sulfur oxide radicals being provided by a catalyst system selected from the group consisting of persulfates, persulfate-bisulfite mixtures and bisulfite-peroxide mixtures, with enough of the catalyst system being used to provide from about 0.05 to about 5 percent by weight of the solution of the sulfur oxide providing solute.

2. A process as in claim 1 for the production of surface active low polymers wherein the catalyst employed is a persulfate.

3. A process as in claim 1 for the production of surface active low polymers wherein the catalyst employed is a persulfate-bisulfite mixture.

4. A process as in claim 1 for the production of surface active low polymers wherein the catalyst employed is a bisulfite-peroxide mixture.

References Cited in the file of this patent

UNITED STATES PATENTS

| | | |
|---|---|---|
| 2,326,326 | Breedis | Aug. 10, 1943 |
| 2,398,426 | Hanford | Apr. 16, 1946 |
| 2,462,390 | Harmon | Feb. 22, 1949 |
| 2,504,411 | Harmon | Apr. 18, 1950 |
| 2,618,626 | Van Dijk et al. | Nov. 18, 1952 |